United States Patent Office 3,072,300
Patented Jan. 8, 1963

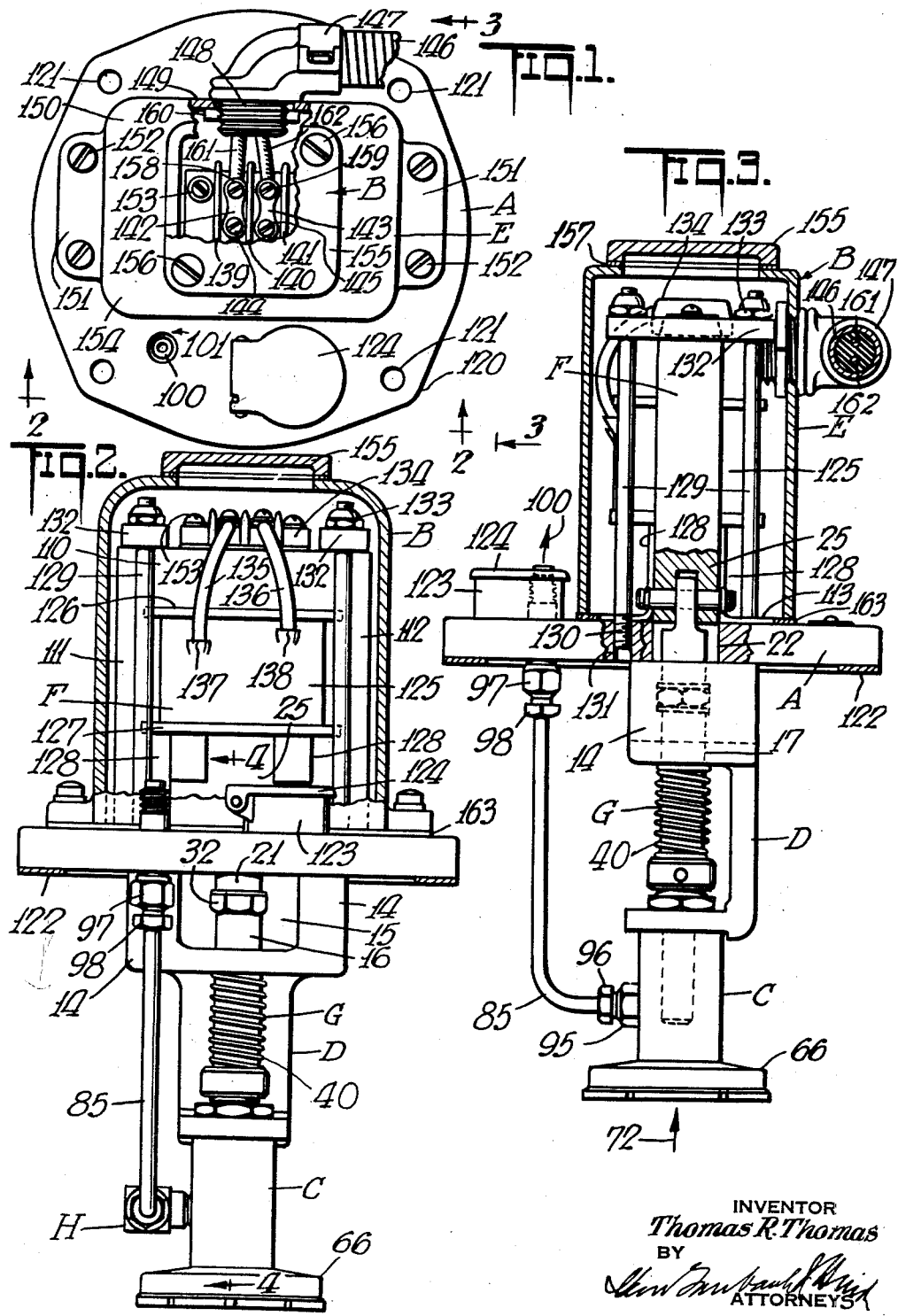

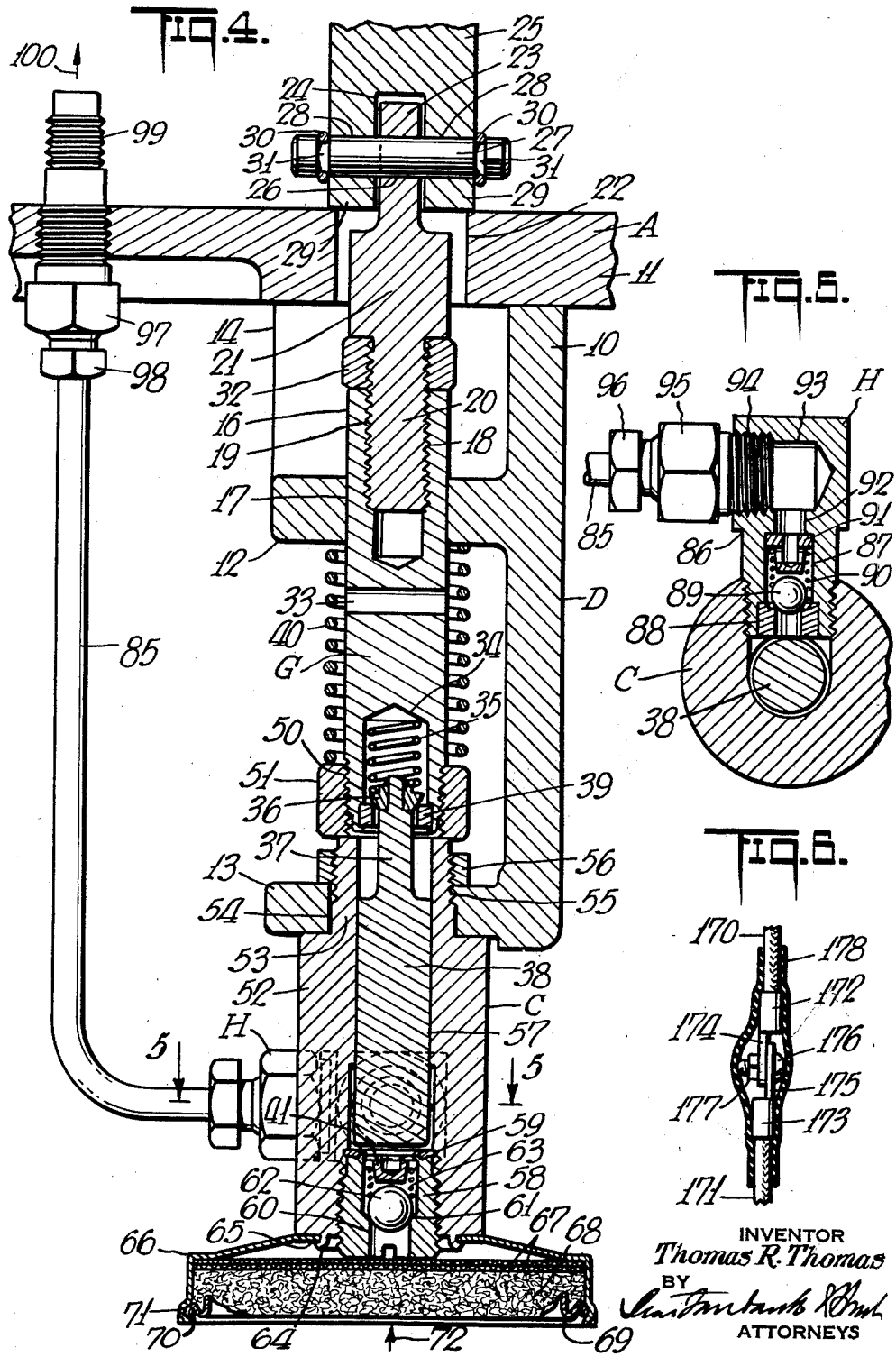

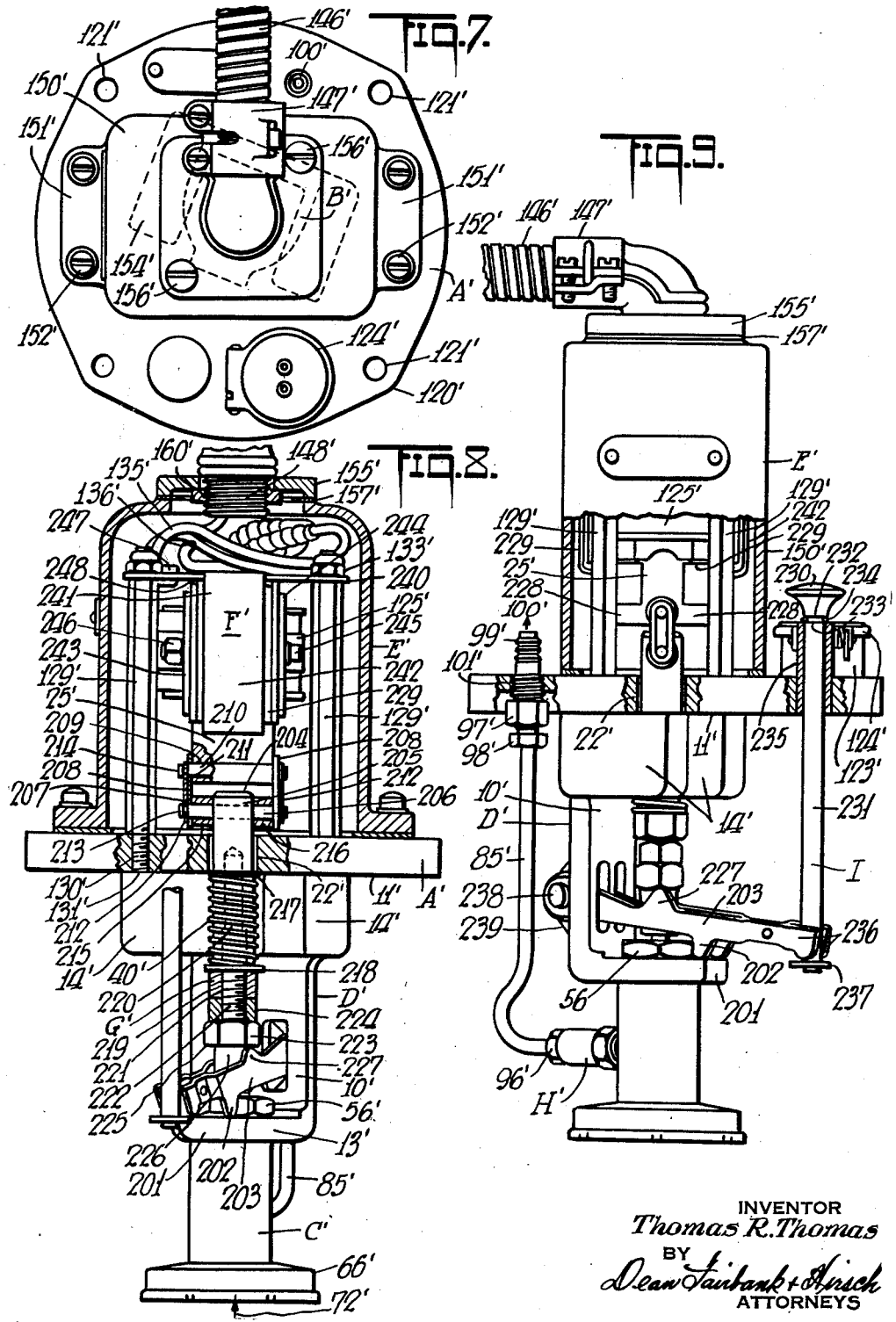

3,072,300
SOLENOID OPERATED PUMP
Thomas R. Thomas, New York, N.Y., assignor to Auto Research Corporation, Dover, Del., a corporation of Delaware
Filed July 20, 1959, Ser. No. 828,321
2 Claims. (Cl. 222—333)

The present invention relates to a solenoid operated pump and it particularly relates to a solenoid operated centralized lubricating pump.

Although not limited thereto the present invention will be particularly described in its application to a centralized lubricating installation in which a central lubricating pressure source, but preferably a solenoid operated reciprocating elongated piston plunger pump is utilized to supply pre-determined quantities of lubricant in accordance with the amount of operation of the machine to widely spaced distributed bearings of a mechanism at different levels through high restriction metering fittings during operation in accordance with the varying lubricant needs.

It has been found that in solenoid operated or magnetic operated lubricant pump to obtain an accurate flow of lubricant in accordance with the operation of the machine, that it is necessary to provide a magnetic or solenoid structure which will operate reliably over long periods of time and which will not, because of the abrupt starting and stopping of the solenoid, tend to break down or vary in its lubricant feed.

It is therefore among the objects of the present invention to provide an improved solenoid operated structure of the character described in which the solenoid operated motor is desirably mounted in such a manner as not to subject the pump or oil metering structure to unnecessary stress or strain as would likely result in variation in the central metering of lubricant into the distributing system.

Other objects are to provide a reliable solenoid operated pump which will give assurance of reliable operation over long periods of time with high speed of the automatic machines, with wide flexibility of control and with relatively simple, readily serviced mechanisms.

A further object of the present invention is to provide an automatic solenoid operated lubricating pump having wide adaptability and adjustable for wide range which may be controlled by a variety of micro-switches actuated by machine motion, electrical timers, push buttons, foot switches and existing machine circuit controls, or by combinations thereof, without adding other control mechanism to the machinery.

Another object is to provide a novel solenoid operated lubricator which may be readily located in any desired point on the automatic machine without mechanical linkages to give long, continuous, trouble-free operation with assurance of continuous and automatic feed.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to one embodiment of the present invention to provide the solenoid motor structure apart from and independent of the pump housing, although both are mounted upon a common cover or base plate.

Desirably the controls and the solenoid structure are mounted upon a stand or framework which may extend upwardly from the cover of the reservoir while the reciprocating elongated plunger metering element is mounted upon a depending bracket below the cover of the structure so as to depend into a lubricant body or a reservoir casing or an opening in the machine.

The solenoid which actuates the pump may be clamped rigidly upon the top or cover of the lubricant reservoir or it may be suspended from within a case mounted on the top of the lubricant reservoir.

It is also possible to provide an alternative manual actuator by means of which the pump may be optionally manually reciprocated to discharge lubricant into the system.

In the preferred form this is accomplished by having a pull nob upon the cover of the reservoir which will act upon the connecting rod of the plunger of the reciprocating piston pump.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top plan view of a pump structure according to the present invention with the housing for the solenoid motor partly broken away more clearly to show the internal structure.

FIG. 2 is a transverse sectional view upon the line 2—2 of FIG. 1.

FIG. 3 is a side sectional view upon the line 3—3 of FIG. 1.

FIG. 4 is an enlarged sectional view showing the pump and supporting bracket structure taken upon the line 4—4 of FIG. 2 and upon an enlarged scale as compared to FIG. 2.

FIG. 5 is a fragmentary transverse horizontal sectional view upon the line 5—5 of FIG. 4 showing the pump outlet valve construction.

FIG. 6 is a fragmentary transverse sectional view showing a flexible electrical conduit connection.

FIG. 7 is a top plan view of an alternative form of pump structure.

FIG. 8 is a transverse vertical sectional view of the device of FIG. 7 and is similar to the showing of FIG. 2.

FIG. 9 is a side elevational view of the embodiment of FIGS. 6 and 7.

Referring to FIGS. 1 and 2 there is shown a base or cover element A which serves to carry both the motor structure B as well as the pump unit C. The pump unit C is carried by the bracket D whereas the motor structure B has a casing E and an interior solenoid structure F.

From the cover structure A, as best shown in FIGS. 2, 3 and 4, there is provided a depending bracket D which has the leg 10 attached to the lower side 11 of the cover A by means of the side webs 14.

The leg 10 has the forwardly extending arms 12 and 13. The leg 12 together with the side webs 14 and leg 10 forms a pocket 15 for receiving the upper end of the connecting rod 16. The leg 12 has a central bearing opening 17 in which is received the upper end 16 of the connecting rod G.

The upper end 16 of the connecting rod G has a recessed portion 18 which is tapped as indicated at 19 and receives the threaded stud 20 of the connecting member 21. The connecting member 21 extends through the opening 22 in the cover A and it has a reduced thickness flatted portion 23 which extends into the recess 24 on the lower end 25 of the plunger of the solenoid F.

The flatted portion 23 has an opening 26 through which extends the pivotal connecting pin 27. The pivotal connecting pin also extends through the openings 28 in the slotted arms 29 at the lower end of the plunger 25.

The pin 27 is held in position by the rings 30 which fit in the ridges, recesses or grooves 31. The lock nut 32 will hold the threaded stud 20 firmly in position in the tapped recess 19 at the upper end 16 of the connecting rod G.

The connecting rod G has a through opening 33 below the leg 12 for holding purposes during assembly and at its lower end it has a recess 34 to receive the spring 35.

The spring 35 presses down on the half ball 36. For maximum shock resistance the half ball 36 is solidly joined by a fusible alloy, such as silver solder, to the reduced diameter portion 37 of the piston 38. The half ball 36 is mounted and bears upon the ring 39 in the lower end of the recess 34.

The connecting rod G is held in a downward position by the compression type spring 40 which is trapped between the bracket leg 12 and the spring support nut 51, the lower end of the connecting rod G being threaded as indicated at 50 to receive the nut 51.

The cylinder 52 has a reduced diameter portion 53 which extends through the opening 54. The reduced diameter portion 53 is threaded as indicated at 55 and receives the nut 56 by which it is held firmly upon the leg 13.

The cylinder has a vertical bore 57 which receives the unpacked piston 38 which extends close to the inlet valve receptable 58. This inlet valve receptacle clamps the gasket 59 in position and has the central opening 60.

The central opening 60 has a seat 61 for the ball-check 62 which is seated by the spring 63. The spring 63 is held in position by the retainer 41. The lower end of the pump body C is peaned over at 64 to engage the periphery 65 of an opening in the inverted filter cup 66.

The inverted filter cup 66 has therein a double screen 67 with a filter mesh 68. The filter mesh 68 is held in position by the clamp ring 69 and the split lock ring 70 which is snapped in position in the groove 71.

When the solenoid F is electrically energized, the plunger 25 retracts upwardly into the solenoid coil 125. This motion is transmitted by means of the pin 27 and the connecting member 21 to the connecting rod G and piston 38. During this motion, spring 40 is compressed.

As the piston 38 rises, the lubricant will flow upwardly, as indicated by the arrow 72, through the filter 68 and past the screens 67 and the ball-check 62 into the cylinder 57.

When the solenoid coil 125 is de-energized, the spring 40 forces the lubricant to pass through the outlet fitting H into the outlet pipe 85.

The outlet connection H is best shown in FIG. 5. It consists of a fitting 86 having an opening 87 which receives a ball-check seat 88. Inside of the ball-check seat 88 is positioned the ball-check 89 which is pressed against the seat by the spring 90.

The spring is held in position by the retainer 91. The flow passage 92 empties into the recess 93. The recess 93 is tapped as indicated at 94 and receives the outlet connection fitting 95. The fitting 95 has a compression coupling connection 96 to the tubing 85.

As best shown in FIG. 4, the tubing 85 is connected to a coupling connection 97 by means of the tubing compression connection 98. The coupling connection 97 is screwed into the cover A at 101. The projecting portion of coupling 97 is provided with the threaded portion 99 for connecting to the external piping system, as indicated by the arrow 100.

The cover is squared as indicated at 120 and it has the mounting openings 121 (see FIG. 1). The gasket 122 (FIGS. 2 and 3) will enable the cover A to be mounted in a lubricant tight fashion upon a reservoir or recess in the mechanism.

The cover is also provided with the filling opening 123 which is covered by the closure 124.

The solenoid structure F consists of a frame 110, an induction coil 125, and a laminated steel plunger 25.

The frame 110 is also laminated and forms a U with its side members 111 and 112. The lower ends of side members 111 and 112 receive the legs 128 which are bent at right angle at 113 to form a means of locating the solenoid structure F to the top of cover A. The legs 128 are wide enough to form a channel or guided confinement for the plunger 25.

The coil 125 is a tightly wound spool of insulated copper wire held firmly between the upper and lower plates 126 and 127. The upper edges of legs 128 hold coil 125 securely in place between the two side members 111 and 112 of frame 110. The electrical leads 135 and 136 emerge at 137 and 138 from coil 125 and fasten to the connector strips 142 and 143 of terminal block 134. Terminal block 134 is mounted on the upper member 110 of the solenoid structure F and is held in place by screws 153.

As is best shown in FIGS. 1 and 2, the connector strips 142 and 143 are separated from mounting screws 153 and from each other by means of the vanes 139, 140, and 141.

The plunger 25 is laminated and of the shape of an inverted T. The outer edges of the T are guided inside the channel formed by the vertical flat portions of legs 128 when riveted to frame members 111 and 112.

Alignment between the solenoid structure F and the pump unit C is achieved by having the lower end of the studs 129 pass through 4 holes in the lower platform 113 of legs 128. The vertical studs 129 have the lower threaded connections 130 fitting into the tapped recesses 131 in the cover A. The upper ends of the studs 129 extend through the clamp bars 132 and terminate in a threaded portion to receive the nuts 133 which are self-locking.

The electrical line or conduit connection extends through the flexible conduit 146 and into the conduit connection 147. This conduit connection has a threaded nipple 148 which fits into the side 149 of the housing 150 and is held firmly in place by the nut 160. The housing 150 has the base flanges 151 which hold the housing 150 and gasket 163 in position by the screws 152 on the cover or base A.

The leads of the electrical lines 161 and 162 from the conduit 146 are connected to the terminal block 134 by means of the screws 158 and 159 which are mounted in the connector strips 142 and 143.

The top 154 of the housing 150 has the removable cover 155 and gasket 157 held in position by the screws 156.

In the flexible connection, as shown in FIG. 6, the two wire cables 170 and 171 have end sleeves 172 and 173 and eyes 174 and 175. These eyes are connected together by the screw 176 and the nut 177. The entire connection is covered by means of the insulating tape 178. This type of connection, as shown in FIG. 6, may be used in lieu of the terminal block as indicated at 134 in FIGS. 1 and 2.

It will be noted that the solenoid F is mounted independently of its housing E and it may be readily inspected.

It will also be noted that the connections to the terminal block 134 are independent of the mounting for the solenoid and are not carried by the posts 129 or the associated structure.

In operation the solenoid and the pump piston parts undergo abrupt starting and stopping, and the mounting structure as shown in FIG. 3 serves largely to overcome the effect of the resultant banging upon the solenoid structure.

Referring to FIGS. 7 and 8 there is shown a base or cover element A' which serves to carry both the motor structure B' as well as the pump unit C'. The pump unit C' is carried by the bracket D' whereas the motor structure B' has a casing E' and an interior solenoid structure F'.

From the cover element A' as best shown in FIGS. 8 and 9, there is provided a depending bracket D' which has the leg 10' attached to the lower side 11' of the cover A' by means of the side webs 14'.

The leg 10' has the forwardly extending arm 13' which supports the pump unit C' by means of the nut 56'. The arm 13' has a projecting portion 201 which serves as a supporting platform for the depending lobes 202 of the manually operated rocker arm 203.

The upper end 204 of the connecting rod G' has an opening 205 through which extends the pivotal connecting pin 206. The pin 206 also extends through the openings 207 in the connecting links 208.

The solenoid plunger 25' is also provided with an opening 209 through which the pivotal connecting pin 210 extends. Pin 210 also extends through the openings 211 in the connecting links 208.

Both the pin 206 and the pin 210 are held in position by the elongated rings 212 which fit in the ridge, recess or groove 213 in pin 206 and a similar undercut 214 in pin 210.

The pivotal pin 206 carries the spacer collars 215 and 216 between the connecting links 208 and the upper end 204 of the connecting rod G'.

The upper portion 204 of the connecting rod G' is cylindrical in shape and receives the washer 217 which bears against the lower side 11' of the cover A' and prevents the compression type spring 40' from entering the opening 22'.

The spring 40' is supported at its lower end by washer 218 which bears against the hexagonal portion 219 of the connecting rod G'.

The lower end of the connecting rod G' has a recessed portion 220 which is tapped as indicated at 221 and receives the threaded stud 222 of the connecting member 223. The lock nut 224 will hold the threaded stud 222 firmly in position in the tapped recess 221.

In addition to the threaded stud 222 the connecting member 223 has the hexagonal portion 225 and the reduced diameter portion 226.

The reduced diameter portion 226 has the recess 34' (not shown) to receive the piston 38' in a similar way as shown by the construction in FIG. 4. The related assembly parts being 35', 36' and 39'.

The reduced diameter 226 passes between the projecting lobes 227 of the rocker arm 203.

The downward travel of the connecting rod G' is stopped by the lower edge of hexagonal portion 225 of the connecting member 223 bearing against the projecting lobes 227 of the rocker arm 203.

The respective hexagonal portions 219 and 225 of the connecting rod G' and the connecting member 223 provide a readily accessible holding means during assembly and in making changes in the stroke setting of the connecting rod G'.

When the solenoid F' is electrically energized the plunger 25' is pulled upwardly into the solenoid coil 125' until the arms 228 of the plunger 25' are stopped by the armature frame 229. The upward pull of the plunger 25' is transmitted through the pivotal pin 210, connecting links 208 and pivotal pin 206 to the connecting rod G', connecting member 223 and piston 38'. During this upward motion of the connecting rod G' the spring 40' is compressed.

The travel of the piston 38' may be reduced to alter the output of the pump unit C' by changing the length of the assembly consisting of the connecting rod G', lock nut 224 and connecting member 223. This is accomplished by unscrewing the connecting member 223 from the rod G', a distance equal to the required reduction in stroke. The lock nut 224 is retightened against the connecting rod G' to hold the threaded stud 222 firmly in its set position.

The pump unit C' may be manually operated independently of the solenoid structure F' by means of the rod assembly I, which can be lifted upwardly by the button type handle 230. The handle 230 is threaded on a reduced diameter portion of the rod 231 and bears against the shoulder 232. Adjacent to the threaded portion of the rod 231 is a shouldered step 233 to retain the O-type resilient ring 234. The ring 234 rests against the projecting end of bearing 235 which is pressfitted into the top of the cover A'. The ring 234 provides a shock-absorbing means to dampen out a tendency for the rod to jiggle up and down during operation of the solenoid structure F'.

The rod 231 passes through and is guided by the bearing 235. The lower end of the rod 231 passes between the lobes 236 at the extremity of the rocker arm 203.

A washer 237 is swaged onto a reduced diameter portion of the rod 231 at its lower end. The washer 237 provides a lifting surface which will come into contact with and support the rocker arm lobes 236 when the rod assembly I is manually raised. As the rod assembly I is elevated the rocker arm 203 will pivot around the pin 238 which is mounted in a through hole in the vertical web 239 extending outwardly from the bracket leg 10'. The rocker arm lobes 227 will impart the lifting motion to the connecting rod G' and allied parts and will cause a quantity of lubricant to be sucked into pump cylinder and then be discharged from the pump unit C' under the load of spring 40'.

The pin 238 is retained in position by a head at one extremity and a cotter type through pin at the other end.

The solenoid structure F' consists of a mounting plate 240 which supports the depending armature frame 229 by means of the U-shaped spring clip 241, whose depending legs 242 are turned inwardly to grip the lower end of the armature frame 229.

The interconnecting member between the legs 242 of the spring clip 241 passes over and around the base plate 240. There is a resilient rubberized pad 260 between plate 248 and solenoid frame to take up operation shocks. Centrally located within the armature frame 229 is a wire wound spool or electrical solenoid coil 125'. The solenoid coil 125' is retained in position by the side plates 243 and 244 which are clamped against the sides of the armature frame 229 by the through bolts 245. The bolts 245 are secured by means of the nut 246.

The vertical solenoid mounting studs 129' are fastened at their lower end by the threaded portion 130' in the tapped recess 131' in the cover A'. The upper ends of the solenoid mounting studs 129' are provided with a similar threaded portion of reduced diameter. These threaded ends pass through holes in the base plate 240 and have the retaining nuts 133'. Between the threaded extremities the studs 129' are hexagonal in shape to facilitate their assembly and easy removal for servicing.

Extending outward and upward from the coil 125' are the electrical conduits or leads 135' and 136'. Both the leads 135' and 136' pass through a hole in the base plate 240 which is provided with the rubber-like grommet or liner 247 to prevent chafing or abrasion to the insulation of the leads.

The top of the casing E' has the removable cover 155' mounted on the gasket 157' and held in place by the screws 156'.

The electrical input line extends through the flexible conduit 146' and into the conduit terminal 147'. The conduit terminal has a threaded nipple 148' which fits into the top of the cover 155' and is held in place by the nut 160'.

The two leads 158' and 159' of the electrical input line are connected to the solenoid leads 135' and 136' by means of a connection as best shown in FIG. 6.

The lubricator unit as above described with either the fixed mounting as shown in FIG. 1 or the suspended mounting as shown in FIG. 8 will respond to machine operation to supply predetermined quantities of lubricant to the bearing throughout the operation of the machine.

The manual actuator 230 of FIG. 9 will permit an initial supply of lubricant before starting of the operation, independently of the solenoid motor action.

The hand actuating nob 230 will be readily adjustable at the side of the housing E'.

The conduit cable arrangement indicated at 146 in FIG. 1 or 146' in FIGS. 7 and 9, will permit ready attachment of the wiring and servicing of the device.

The piston may vary widely in diameter and stroke but it is found that a ⅜ inch piston with a one-half stroke is quite satisfactory for most machine lubrication.

The springs G and G' preferably give a pressure discharge of about 25 to 40 pounds per square inch with an average of 30 pounds per square inch.

The stroke may be adjusted from ⅛ inch up to ½ inch and even up to 9/16 inch or ⅝ inch.

The solenoid may be actuated from 110 volt, 60 cycle circuit, either by a manual push button; by a machine operated switch, or an automatic device actuated by an electric timer.

With a machine operated switch, the switch is operated by a cam mechanism which will be rotated by a machine part.

To indicate that the solenoid is operated, a blinker light may be wired in series with the connections to the conduits 146 and 146'.

The solenoid actuated pressure lubricant source of the present invention may be widely used for all types of machine tools or automatically operated mechanisms having associated electrical circuits.

As many changes could be made in the above solenoid operated pump and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a centralized lubricating system, a central solenoid pump and reservoir unit comprising a reservoir cover carrying a solenoid housing on its top face and a reciprocating unpacked elongated plunger pump supported substantially below the bottom face and a depending vertical bracket from said bottom face having a transverse arm at its lower end carrying the upper end of the plunger pump, said solenoid having a vertically reciprocating elongated armature above the cover, a connection stud pivotally connected to the lower end of the armature extending through the cover, a connecting rod extending downwardly from and connected to the lower end of the stud, a box structure extending laterally outwardly from the bracket enclosing the lower part of the stud and the upper end of the connecting rod and a spring relief connection from the lower end of the connecting rod to the upper end of the plunger of the pump above said transverse arm, said solenoid including a top plate, a coil depending from and supported by said top plate and a plurality of side posts encircling the solenoid and connected at their upper ends to the top plate and at their lower ends to the cover and electric connections to the solenoid mounted on the top of said top plate.

2. In a centralized lubricating system, a central solenoid pump and reservoir unit comprising a reservoir cover carrying a solenoid housing on its top face and a reciprocating unpacked elongated plunger pump supported substantially below the bottom face and a depending vertical bracket from said bottom face having a transverse arm at its lower end carrying the upper end of the plunger pump, said solenoid having a vertically reciprocating elongated armature above the cover, a connection stud pivotally connected to the lower end of the armature extending through the cover, a connecting rod extending downwardly from and connected to the lower end of the stud, a box structure extending laterally outwardly from the bracket enclosing the lower part of the stud and the upper end of the connecting rod and a spring relief connection from the lower end of the connecting rod to the upper end of the plunger of the pump above said transverse arm, a lever arrangement carried by said bracket between the box and the transverse arm, said lever having a pivotal connection on the side of the bracket away from the connecting rod, said lever extending across said connecting rod and having a driving connection thereon, said connecting rod having a corresponding driving connection thereon, and a vertical reciprocable manual actuating means extending down through the cover and having a connection to the end of said lever away from said bracket, said driving connections being engageable on operation of said actuating means to operate said pump.

References Cited in the file of this patent

UNITED STATES PATENTS

| 2,382,426 | Kocher | Aug. 14, 1945 |
| 2,410,692 | Strobell | Nov. 4, 1946 |
| 2,524,645 | Abbott | Oct. 3, 1950 |

FOREIGN PATENTS

| 375,291 | Great Britain | June 21, 1932 |